(12) United States Patent
Kishi et al.

(10) Patent No.: US 9,182,037 B2
(45) Date of Patent: Nov. 10, 2015

(54) CONTROL DEVICE FOR VEHICLE (71) Applicant: NISSAN MOTOR CO., LTD., Yokohama-shi, Kanagawa (JP)

(72) Inventors: Daigo Kishi, Sagamihara (JP); Kenichiro Murakami, Atsugi (JP); Toshiya Sakai, Kawasaki (JP); Yasuyoshi Yoda, Atsugi (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/413,632

(22) PCT Filed: Jul. 11, 2013

(86) PCT No.: PCT/JP2013/069052
§ 371 (c)(1),
(2) Date: Jan. 8, 2015

(87) PCT Pub. No.: WO2014/010705
PCT Pub. Date: Jan. 16, 2014

(65) Prior Publication Data
US 2015/0204442 A1 Jul. 23, 2015

(30) Foreign Application Priority Data

Jul. 12, 2012 (JP) ................................. 2012-156454

(51) Int. Cl.
*F16H 61/66* (2006.01)
*F16H 61/02* (2006.01)

(52) U.S. Cl.
CPC ............ *F16H 61/66* (2013.01); *F16H 61/0213* (2013.01); *F16H 2061/0234* (2013.01)

(58) Field of Classification Search
None
See application file for complete search history.

(56) References Cited

U.S. PATENT DOCUMENTS

| 6,315,693 | B1 * | 11/2001 | Tayama | 477/46 |
| 6,385,521 | B1 * | 5/2002 | Ito | 701/53 |
| 2002/0165063 | A1 * | 11/2002 | Ito | 477/37 |
| 2004/0194754 | A1 * | 10/2004 | Yamaoka et al. | 123/295 |

FOREIGN PATENT DOCUMENTS

| JP | 4-272565 A | 9/1992 |
| JP | 8-277895 A | 10/1996 |
| JP | 2002-321549 A | 11/2002 |
| JP | 2003-222230 A | 8/2003 |
| JP | 2005-199971 A | 7/2005 |

* cited by examiner

Primary Examiner — Edwin A Young
(74) Attorney, Agent, or Firm — Foley & Lardner LLP

(57) ABSTRACT

When an operating point that is determined by the engine speed (Ne), the engine torque (Te), and the vehicle speed falls within the zones of both a first vibration risk region ($\alpha 1$) and a second vibration risk region ($\alpha 2$), the dwell time ($\Delta T1$) thereof is measured, and once this dwell time ($\Delta T1$) reaches a predetermined vibration assessment time ($\Delta T1\_Lim$), the gear ratio of the continuously variable transmission is corrected towards the large side (low side) so that the operating point is moved out of the vibration risk regions ($\alpha 1$, $\alpha 2$).

9 Claims, 10 Drawing Sheets

FIG.1

1 ··· ENGINE
2 ··· TORQUE CONVERTER
3 ··· CVT
5 ··· CONTROL SECTION

FIG.13

CONTROL DEVICE FOR VEHICLE

TECHNICAL FIELD

This invention relates to a control for a vehicle including an engine and a continuously variable transmission, and more specifically to an art to suppress vibration of the vehicle.

BACKGROUND ART

A patent document 1 discloses an art which suppresses vibration of a vehicle, and in which an operation line of a operating point used for setting of a target engine speed (a transmission input rotation speed) and a target engine torque is switched from an operation line for giving weight to a fuel economy, to an operation line for reducing the vibration to avoid a operating point at which muffled noise and the vibration are generated, in a low-middle engine speed and middle-high torque region in which the vibration is easy to be generated, that is, in which the ratio of the variation amount of the engine torque to the variation amount of the engine speed is large.

PRIOR ART DOCUMENT

Patent Document

Patent Document 1: Japanese Patent Application Publication No. 2005-199971

SUMMARY OF THE INVENTION

Problems which the Invention is Intended to Solve

As to the influence on the passenger due to the vibration of the vehicle, even when the vibration of the vehicle or the abnormal noise such as the muffled noise generated by this vibration is generated in the low-middle engine speed and middle-high torque region and so on, the large uncomfortable feeling and the large unnatural feeling may not be immediately provided to the passenger. When these vibration continues during a certain time period (for example, about 0.5 second to 5 second), the unnatural feeling and the uncomfortable feeling are provided to the passenger, so that the ride quality is deteriorated. Accordingly, in the above-described conventional example in which the operating point is immediately switched to the operating point for avoiding the vibration region when the operating point enters the region in which the vibration is easy to be generated, the operating point is switched from the setting for giving weight to the fuel economy, to the setting for the vibration reduction, in a case where the vibration is not actually generated or at a timing immediately after the vibration generation before the uncomfortable feeling and the unnatural feeling are provided to the passenger of the vehicle. Consequently, the setting for the vibration reduction is excessively used, so that it is likely to cause the deterioration of the fuel economy. Moreover, the frequency of the switching of the operating point is increased. With this, the riding feeling may be conversely deteriorated at the switching by the variation of the torque, and so on.

It is, therefore, an object of the present invention to provide a new control device for an internal combustion engine which is devised to solve the above-described problems, to suppress the uncomfortable feeling and the unnatural feeling to the passenger of the vehicle due to the vibration of the vehicle, to suppress excessive switching of the operating point for the vibration avoidance, and to suppress the deterioration of the drivability and the deterioration of the fuel economy.

Means for Solving the Problem

For attaining the above-described object, the present invention includes an engine, and a continuously variable transmission arranged to continuously shift an output of the engine, and to transmit it to a driving wheel side. Moreover, the present invention includes a region judging means configured to judge whether or not a operating point of a vehicle which is determined from a plurality of factors representing a driving state of the vehicle is in a predetermined vibration risk region in which the vibration of the vehicle may be generated; a dwell time period measuring means configured to measure a dwell time period during which the operating point is stayed in the vibration risk region when it is judged that the operating point is in the vibration risk region; and a vibration region avoidance means arranged to vary a transmission gear ratio of the continuously variable transmission so that the operating point is out of the vibration risk region when the dwell time period reaches a predetermined time period.

Benefit of the Invention

In the present invention, when the operating point is stayed in the vibration risk region during a predetermined time period or more, the operating point is moved out of the vibration risk region by varying the transmission gear ratio. Accordingly, it is possible to avoid that the vibration of the vehicle continues beyond the predetermined time period, and to prevent the uncomfortable feeling and the unnatural feeling to the passenger by the continuation of the vibration of the vehicle. Moreover, even when the operating point is in the vibration risk region, the operating point is not switched as long as this state does not continue during the predetermined time period. Accordingly, the switching of the operating point of the vibration avoidance is not excessively performed before the uncomfortable feeling and the unnatural feeling are provided to the passenger, like a case in which the vibration is not actually generated, and a timing immediately after the generation of the vibration. Consequently, it is possible to suppress the deterioration of the drivability and the deterioration of the fuel economy. Accordingly, the switching of the operating point for the vibration avoidance is not excessively performed before the uncomfortable feeling and the unnatural feeling are provided to the passenger, like a case in which the vibration is not actually generated, and a timing immediately after the generation of the vibration. Consequently, it is possible to suppress the deterioration of the drivability and the deterioration of the fuel economy.

DESCRIPTION OF EMBODIMENTS

Figure 1:
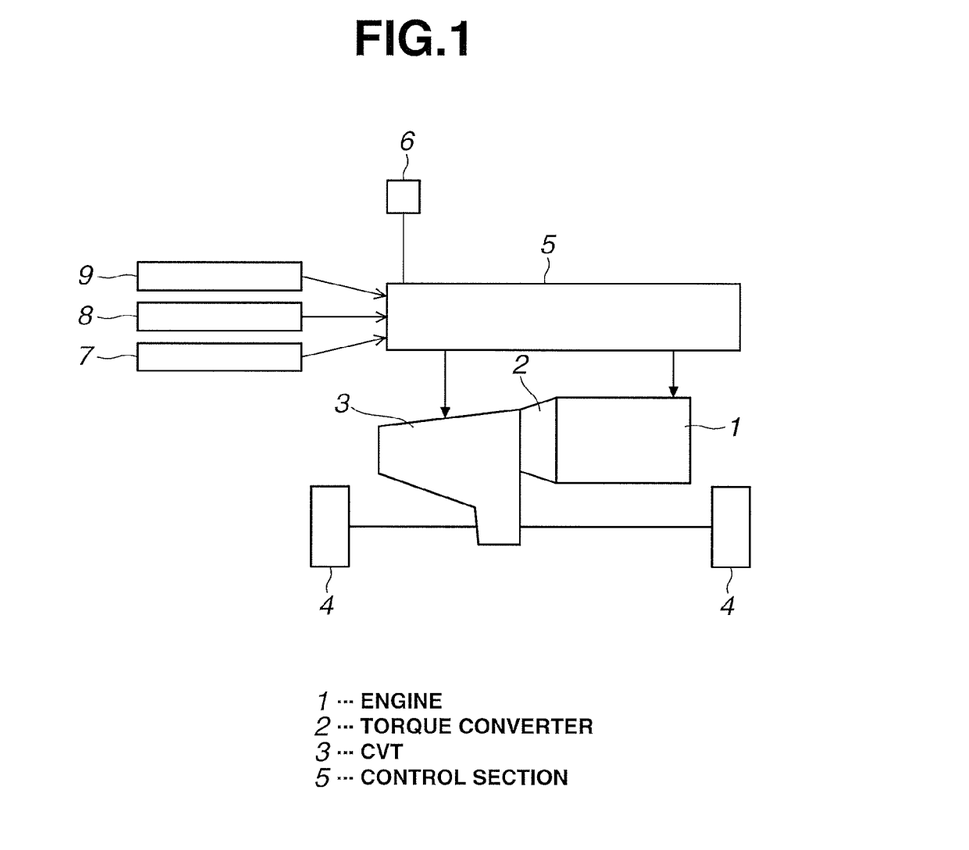
FIG. 1 is a configuration view schematically showing a control device for a vehicle according to one embodiment of the present invention.

Hereinafter, the present invention is illustrated with reference to one embodiment shown in the drawings. FIG. 1 is one example of a vehicle to which a control device according to one embodiment of the present invention is applied. An engine 1 serving as a vehicle power source is connected through a torque converter 2 to a continuously variable transmission (CVT) 3. The continuously variable transmission 3 is arranged to continuously shift a driving force of the engine 1, and to transmit it to a driving wheels 4's side. A control section 5 has a function to store various control operations, and to perform the various control operations. There are provided various sensors arranged to sense a vehicle driving state. These sensors are a crank angle sensor 6 arranged to sense an engine speed (rotation speed) Ne, a vehicle speed sensor 7 arranged to sense a vehicle speed which is a speed of a vehicle, an accelerator opening degree sensor 8 arranged to sense an accelerator opening degree of an accelerator pedal which is operated by a driver, a rotation speed sensor 9 arranged to sense an input (inputted) rotation speed of the continuously variable transmission 3, and so on. The control section 5 is configured to perform an engine control such as a fuel ignition control, an ignition timing control and so on, based on signals inputted from these sensors 6-9, and so on. Moreover, the control section 5 is configured to output a shift signal to the continuously variable transmission 3, and thereby to perform a shift control to vary or hold the transmission gear ratio.

The above-described engine 1 is, for example, a spark ignition gasoline engine, or a compression self-ignition diesel engine. Besides, the control section 5 may be separately provided as an engine control unit and a transmission control unit. These engine control unit and the transmission control unit may be connected to each other through CAN communication system and so on to perform bi-directional communication. Moreover, the vehicle is not limited to a vehicle which uses the only engine 1 as the vehicle driving source, as shown in the drawings. The vehicle may be a hybrid vehicle which combinedly use the engine 1 and a motor as the vehicle driving source.

Figure 2:
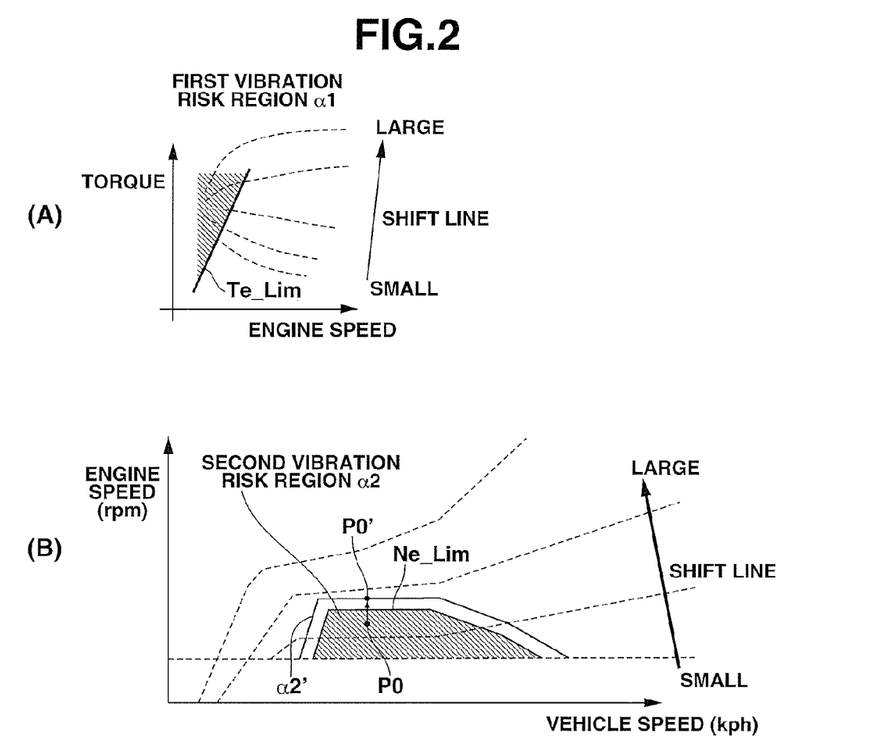
FIG. 2 are explanation views showing a first vibration risk region (A) and a second vibration risk region (B).

FIG. 2 show vibration risk regions in which a vehicle vibration which may provide unnatural feeling or uncomfortable feeling to a passenger of the vehicle is generated. In this embodiment, there are set, as the vibration risk region, two regions of a first vibration risk region α which is determined by the engine speed and the engine torque as shown in FIG. 2(A), and a second vibration risk region α2 which is determined by the engine speed and the vehicle speed (the speed of the vehicle) as shown in FIG. 2(B). In this case, the vibration generated in the first vibration risk region α1 of a low rotation speed and high load side in which the engine speed is low and the engine torque is high is a region in which muffled sound, floor vibration and so on are easy to be generated, as generally known. The request of the decrease of the vibration becomes severe as the engine torque becomes higher.

Figure 3:
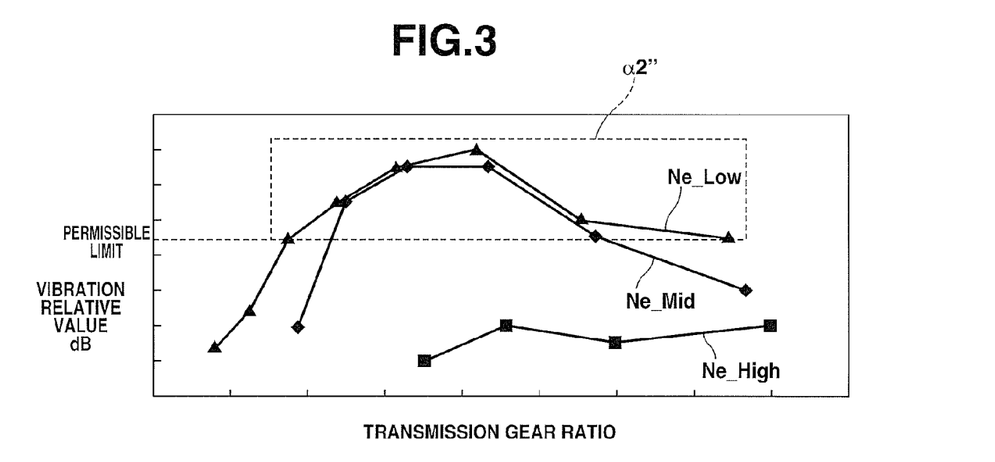
FIG. 3 is a characteristic view showing a relationship between a transmission gear ratio and vibration.

On the other hand, the second vibration risk region α2 is a region which is determined by factors different from those of the above-described vibration risk region α1, that is, by the vehicle speed and the engine speed. That is, the second vibration risk region α2 is a region (α2") which is determined by the transmission gear ratio of the continuously variable transmission 3 and the engine speed, as shown in FIG. 3. With reference to this FIG. 3, three lines in the drawing represent characteristics under conditions of the constant engine speeds. The engine speed is increased in order of Ne_Low, Ne_Mid, and Ne_High. As shown in FIG. 3, when the transmission gear ratio of the continuously variable transmission 3 is in a predetermined intermediate (middle) range (α2"), the vibration becomes largest under the condition of the constant engine speed, due to the torsional resonance action of the mass (weight) system of the power train of the vehicle, and so on. Moreover, the vibration becomes larger as the engine speed becomes lower. Accordingly, the second vibration risk region α2 is set by employing the vehicle speed and the engine speed as the factors, as shown in FIG. 2(B), so as to correspond to the region (α2") in which the vibration becomes larger locally in this way.

Besides, the ranges of the vehicle speed (the transmission gear ratio) and the engine speed in which the operating point becomes the second vibration risk region α2 are varied in accordance with the difference of the vehicles. As one example, it is the low engine speed region in which the engine speed is equal to or lower than about 1000 rpm, and the pulley ratio (the transmission gear ratio) of the continuously variable transmission 3 is near about 1.0.

In this embodiment, when the current operating point (driving point) determined by the engine speed, the engine torque, and the vehicle speed is in both the first vibration risk region α1 and the second vibration risk region α2, and moreover its dwell time period ΔT1 exceeds (is larger than) a predetermined vibration judgment time period ΔT1_Lim, the transmission gear ratio of the continuously variable transmission 3 is varied to the large side (the low side) to suppress and avoid the vibration of the vehicle, so that the operating point is moved out of the vibration risk regions α1 and α2. Detailed control contents will be explained below.

Figure 4:
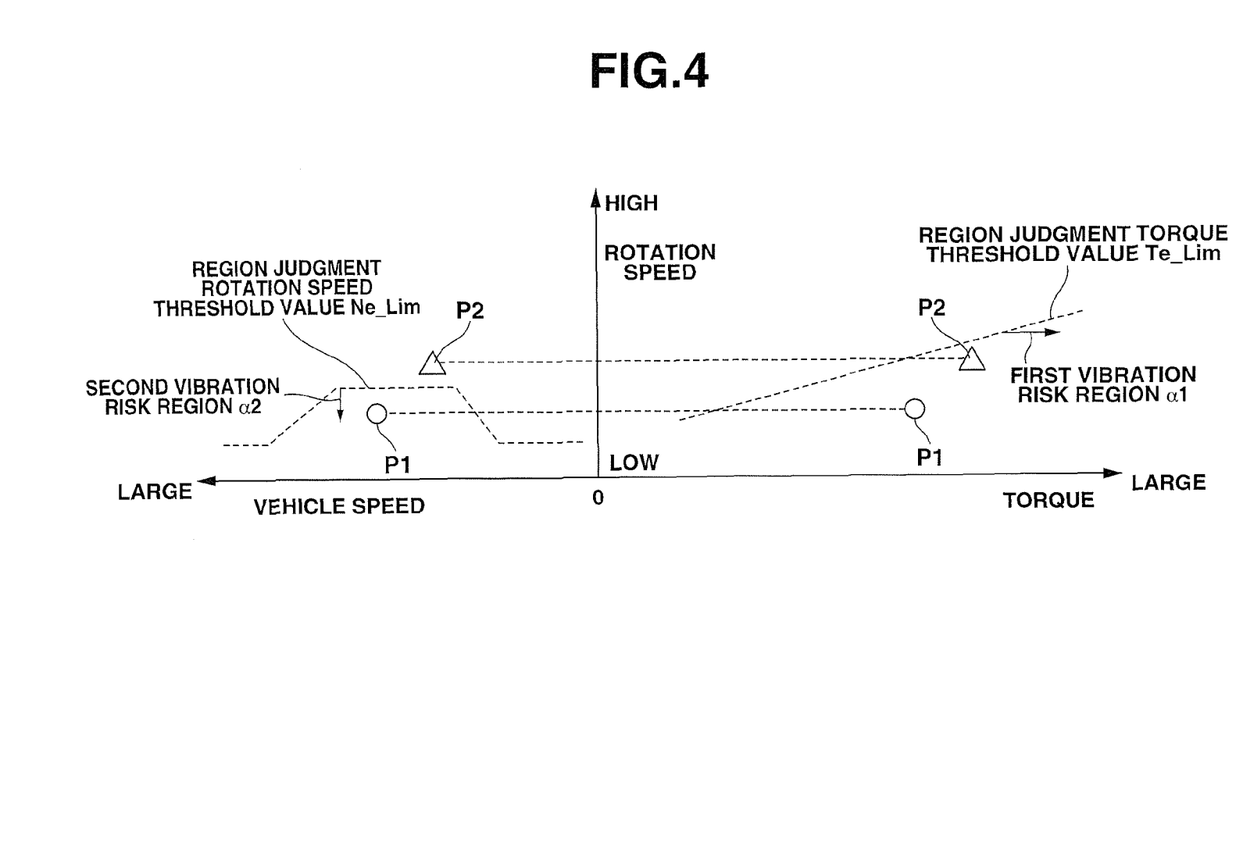
FIG. 4 is an explanation view showing a relationship between operating points, vibration risk regions, and threshold values thereof.

In this embodiment, a region judgment torque threshold value Te_Lim of the first vibration risk region a1 is calculated and set, as the region judging operation, in accordance with the engine speed as shown in FIG. 2 and FIG. 4, for simplifying the control logic. When the engine torque Te is equal to or greater than the region judgment torque threshold value Te_Lim, the first vibration risk region α1 is judged (determined). Moreover, a region judgment rotation speed threshold value Ne_Lim of the second vibration risk region α2 is calculated and set in accordance with the vehicle speed. When the engine speed Ne is equal to or smaller than the region judgment rotation speed threshold value Ne_Lim, the second vibration risk region α2 is judged (determined).

For example, in the operating point P1 of FIG. 4, the engine torque is equal to or greater than the region judgment torque threshold value Te_Lim, and the engine speed is equal to or smaller than the region judgment rotation speed threshold value Ne_Lim. Accordingly, it is judged that the operating point P1 is in both the first and second vibration risk regions α1 and α2. On the other hand, in the operating point P2 of FIG. 4, the engine torque is equal to or greater than the region judgment torque threshold value Te_Lim. Accordingly, the operating point P2 is in the first vibration risk region α1. However, the engine speed is greater than the region judgment rotation speed threshold value Ne_Lim, and accordingly the operating point P2 is out of the second vibration risk region α2. Therefore, it is judged that the operating point P2 is out of the vibration risk region.

Figure 5:
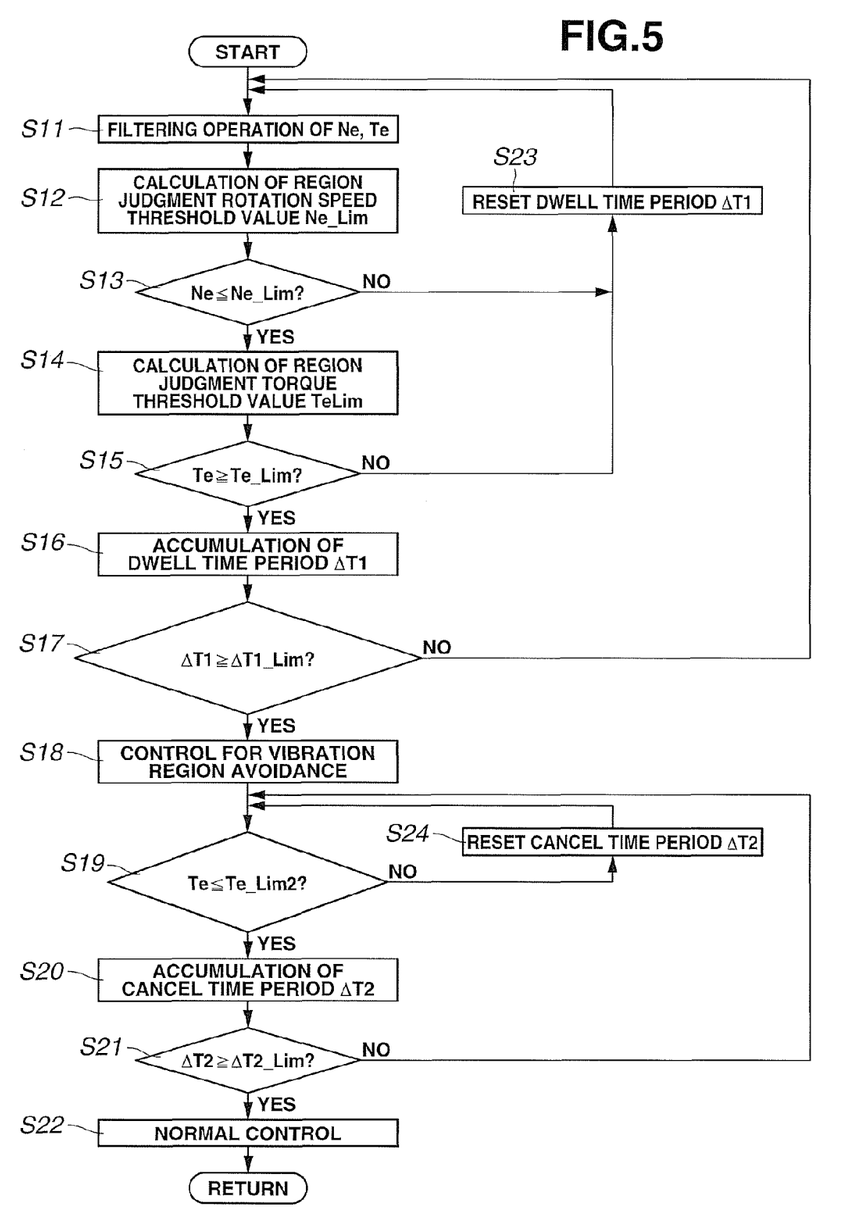
FIG. 5 is a flowchart showing a flow of a control according to the above-described embodiment.
Figure 6:
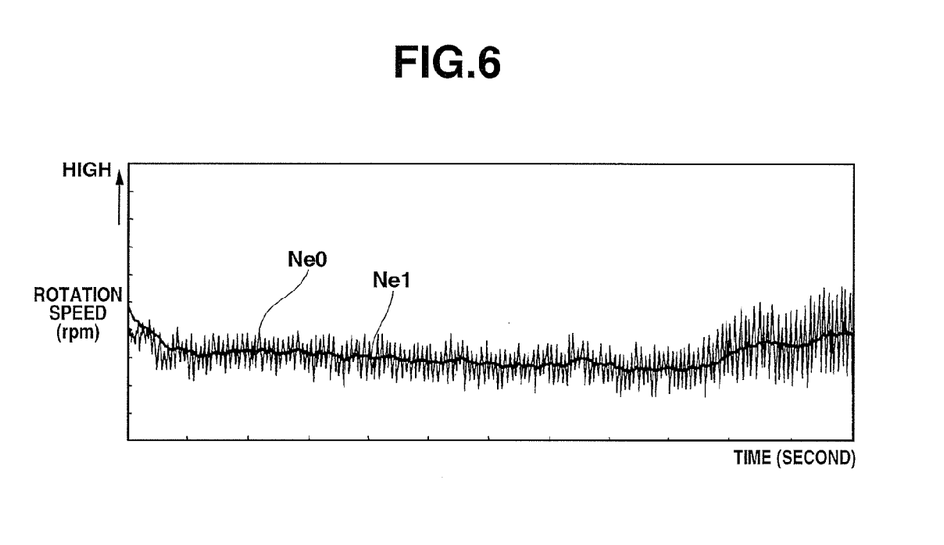
FIG. 6 is a characteristic view showing a value Ne0 of an engine speed before filtering operation, and a value Ne1 of the engine speed after the filtering operation.

FIG. 5 is a flowchart showing a flow of a control according to this embodiment. In the engine speed Ne, the engine torque Te, and the vehicle speed which are used in the judgment of the vibration risk region, the engine speed Ne and the engine torque Te has the large variations of the detection value or the presumed value (the amplitude of the vibration (oscillation)). Accordingly, at step S11, a filtering operation is performed so as to smooth the engine speed Ne and the engine torque Te. In particular, as shown in FIG. 6, the engine speed Ne0 sensed by the crank angle sensor is smoothed by the known filtering operation (moderating operation) such as the first-delay operation and so on, so that the smoothed engine speed Ne1 is determined. Near the vibration risk region, the sensed engine speed Ne0 has the large influence of the vibration. However, the vibration risk region is judged by using the smoothed engine speed Ne1. With this, it is possible to suppress and avoid the erroneous judgment due to the variation (vibration (oscillation)) of the engine speed Ne0.

Figure 7:
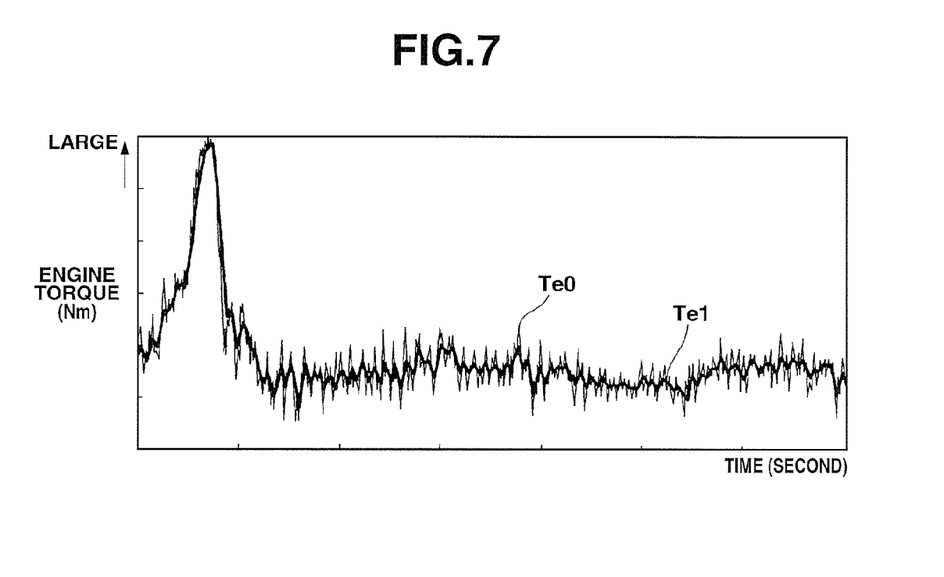
FIG. 7 is a characteristic view showing a value Te0 of an engine torque before the filtering operation, and a value Te1 of the engine torque after the filtering operation.

Similarly, as shown in FIG. 7, the presumed engine torque Te0 is smoothed by the filtering operation (moderating operation), so as to determine (obtain) the smoothed engine torque Te1. The vibration risk region is judged by using this smoothed engine torque Te1. With this, it is possible to suppress and avoid the erroneous judgment due to the variation (the vibration (oscillation)) of the engine torque Te1.

Again, with reference to FIG. 5, at step S12, the region judgment rotation threshold value Ne_Lim of the second vibration risk region α2 is calculated and set in accordance with the vehicle speed as described above. At step S13, it is judged that the engine speed Ne is equal to or smaller than the above-described region judgment rotation speed threshold value Ne_Lim. At step S14, the region judgment torque threshold value Te_Lim of the first vibration risk region α1 is calculated and set in accordance with the engine speed. At step S15, it is judged that the engine torque Te is equal to or greater than the above-described region judgment torque threshold value Te_Lim.

When the operating point exists in both the first and second vibration risk regions α1 and α2, both answers of steps S13 and S15 are affirmative. Then, the process proceeds to step S16. A dwell (stay) time period ΔT1 during which the operating point is stayed in the vibration risk regions α1 and α2 are measured and accumulated. In particular, a unit time (a calculation interval) is added to a value of a timer which counts the dwell time period ΔT1, and the accumulation value of the dwell time period ΔT is renewed.

Besides, when the engine torque Te is not equal to or greater than the above-described region judgment torque threshold value Te_Lim, or when the engine speed Ne is not equal to or smaller than the above-described region judgment rotation speed threshold value Ne_Lim, the process proceeds from the step S13 or S15 to step S23. The dwell time period ΔT1 is reset to "0". The process returns to step S11.

At step S17, it is judged whether or not the dwell time period ΔT1 accumulated and renewed at step S16 is equal to or greater than a predetermined vibration judgment time period ΔT1_Lim. This vibration judgment time period ΔT1_Lim corresponds to a time period which is previously set by the experiment and so on, and after which a passenger of the vehicle starts to feel the unnatural feeling and the uncomfortable feeling. For example, this vibration judgment time period ΔT1_Lim is set, for example, to about 0.5-5 seconds. Besides, in this embodiment, the vibration judgment time period ΔT1_Lim set to a fixed value. However, the vibration judgment time period ΔT1_Lim may be adjusted in accordance with the vibration level and so on.

When the dwell time period ΔT1 does not reach the vibration judgment time period ΔT1_Lim, the process returns to step S11. The process repeats the operations of the above-described steps S11-S16. When the dwell time period ΔT1 reaches the vibration judgment time period ΔT1_Lim, the process proceeds to step S18. The control for the vibration region avoidance (for avoiding the vibration region) to move the operating point to a position which is out of the vibration risk region is performed. In this embodiment, the control is performed, as the control for the vibration region avoidance, to correct the transmission gear ratio to the larger side by correcting the input rotation speed of the continuously variable transmission 3 to the increase side, as described later.

Figure 8:
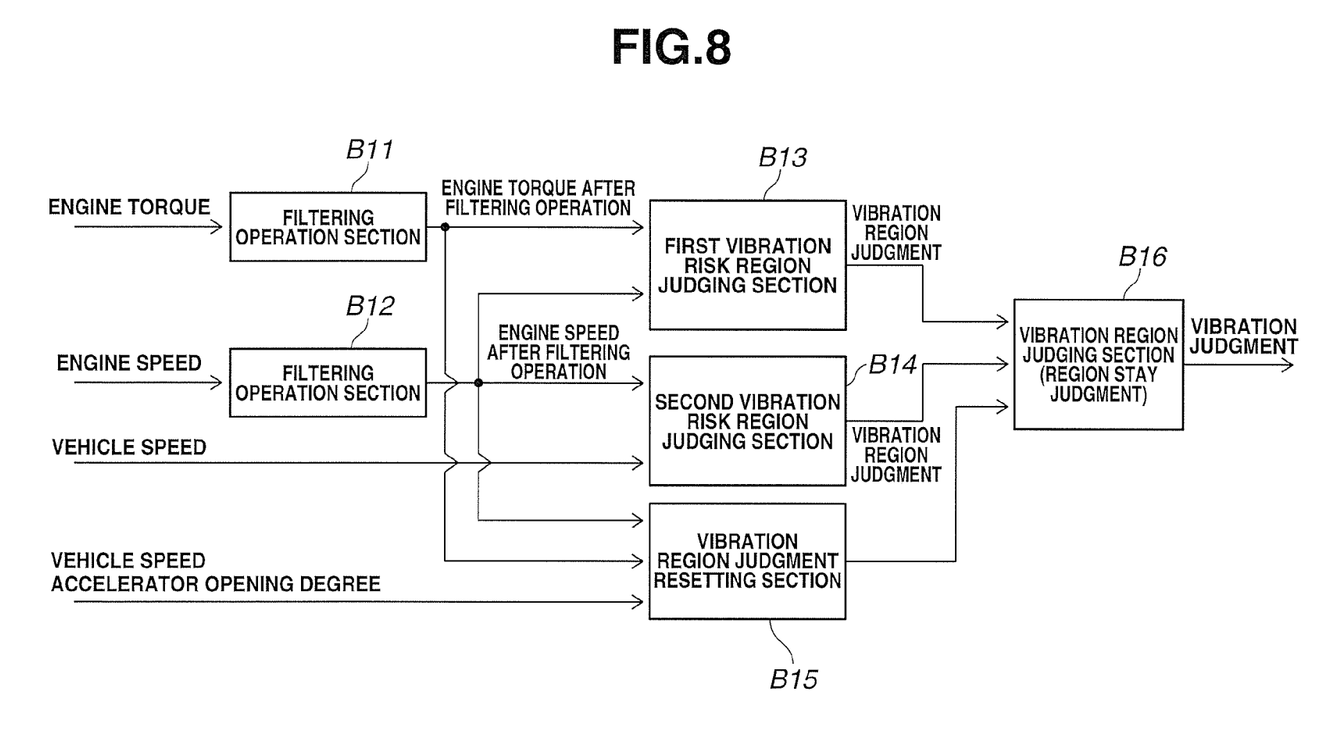
FIG. 8 is a functional block diagram showing an judgment operation of the vibration risk region.

These judgment operation of the vibration risk region and the control operation for the vibration region avoidance are explained with reference to FIG. 8 and FIG. 9. FIG. 8 is a functional block diagram showing the judgment operation of the vibration risk region. Besides, this judgment operation of the vibration risk region is substantially identical to the contents described above at steps S11-S17 of FIG. 5. Accordingly, the brief explanation is performed.

A filtering operation section B11 for the engine torque performs the filtering operation with respect to the engine torque, and outputs the smoothed engine torque after the filtering operation. Similarly, the filtering operation section B12 for the engine speed performs the filtering operation with respect to the engine speed, and outputs the smoothed engine speed after the filtering operation. A first vibration risk judging section B13 judges whether or not the operating point determined by the engine torque and the engine speed exists within the first vibration risk region cd, based on the engine torque after the filtering operation, and the engine speed after the filtering operation. A second vibration risk region judging section B14 judges whether or not the operating point determined by the engine speed and the vehicle speed exists within the second vibration risk region α2, based on the engine speed after the filtering operation and the vehicle speed. A vibration region judgment resetting section B15 judges whether or not the above-described judgment operation of the vibration risk region is reset, based on at least one of the engine speed after the filtering operation, the engine torque after the filtering operation, and the vehicle speed. Then, a vibration region judging section (region stay judging section) B16 judges whether or not the operating point is stayed in both the regions α1 and α2, based on the judgment results of the above-described B13-B15, and outputs the signal of the vibration judgment to a vibration avoidance rotation speed control section B21 of FIG. 9 when its dwell time period ΔT1 reaches the predetermined vibration judgment time period ΔT1_Lim.

Figure 9:
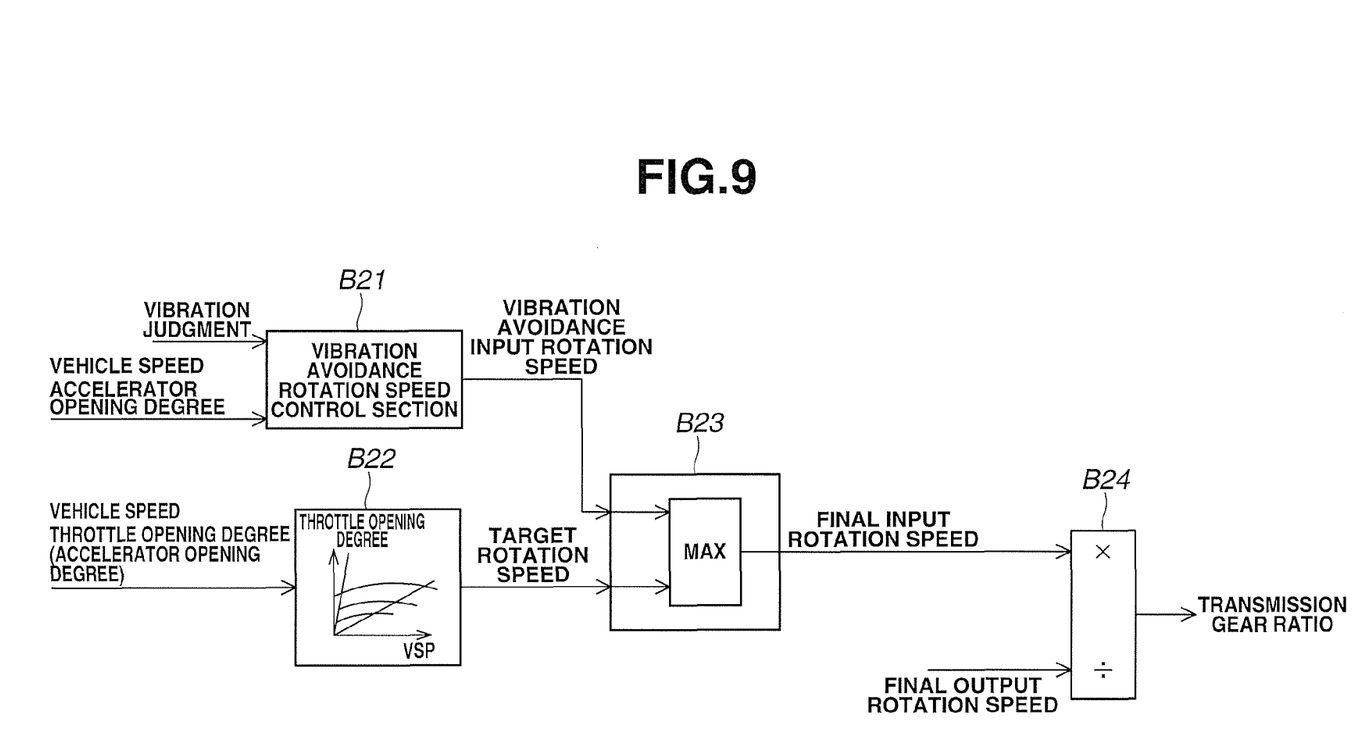
FIG. 9 is a functional block diagram showing one example of a calculation operation of the transmission gear ratio of a continuously variable transmission in a vibration region avoidance control.

FIG. 9 is a functional block diagram showing one example of the vibration region avoidance control. The vibration avoidance rotation speed control section B21 calculates the input rotation speed for the vibration region avoidance based on the vehicle speed and the accelerator opening degree when the dwell time period $\Delta T1$ reaches the vibration judgment time period $\Delta T1\_Lim$ and the vibration judgment is inputted. For example, as shown in FIG. 2(13), an operation line $\alpha 2'$ for the vibration region avoidance, which is out of the second vibration risk region $\alpha 2$ toward the high speed side by a predetermined amount is previously set. The input rotation speed for the vibration region avoidance is set so that the operating point P0 is shifted to the position P0' on the operation line $\alpha 2'$. At a block B22, a target rotation speed of the transmission input rotation speed is set based on the vehicle speed and the throttle opening degree (or the accelerator opening degree) with reference to the predetermined control map so as to attain best fuel economy. Then, at block B23, larger one of the vibration avoidance input rotation speed and the target rotation speed is selected and set as a final target input rotation speed.

In this case, the input rotation speed for the vibration region avoidance which is set by a vibration avoidance rotation speed control section B21 at the vibration judgment becomes a value corrected toward the increase side relative to the target rotation speed at which the fuel economy becomes best (the best fuel economy is attained), so that the engine speed is moved out of the second vibration risk region $\alpha 2$ toward the high rotation speed side. Accordingly, at the vibration judgment, the transmission input rotation speed for the vibration region avoidance which is a larger value is set as the final target input rotation speed.

Then, a transmission gear ratio calculating section B24 calculates the target value of the transmission gear ratio of the continuously variable transmission 3, based on the final target input rotation speed, and the final transmission output rotation speed calculated by the control section 5. That is, the transmission gear ratio is determined by dividing the target input rotation speed by the output rotation speed. As described above, at the vibration judgment, the input rotation speed is corrected to the high rotation speed side. Accordingly, the transmission gear ratio is corrected to the large side (the low side).

Figure 10:
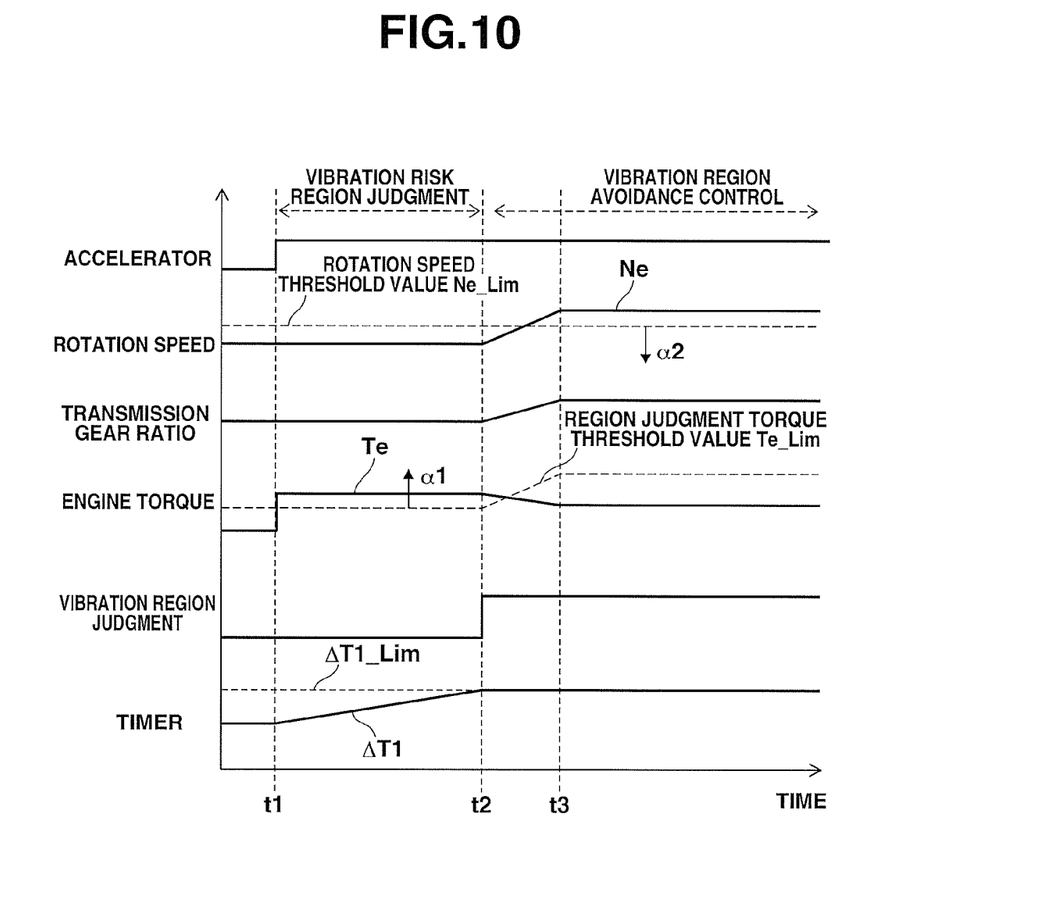
FIG. 10 is a timing chart at a judgment of the vibration risk region and at the vibration region avoidance control when the control according to the one embodiment is applied.

In this way, the transmission gear ratio is corrected. With this, as shown in FIG. 10, the engine speed Ne becomes higher than the rotation speed threshold value Ne_Lim, and the operating point becomes out of the second vibration risk region $\alpha 2$. The value of the region judgment torque threshold value Te_Lim which is set based on the engine speed Ne becomes large in accordance with this increase of the engine speed Ne. Accordingly, the engine torque Te becomes out of the first vibration risk region $\alpha 1$.

FIG. 10 is a timing chart at the judgment of the vibration risk region and the vibration region avoidance control when the control according to this embodiment is applied. At time t1 at driving while the engine speed is equal to or smaller than the rotation speed threshold value Ne_Lim, when the engine torque becomes equal to or greater than the torque threshold value Te_Lim in accordance with the increase of the accelerator opening degree, the operating point exists in both the vibration risk regions $\alpha 1$ and $\alpha 2$. The dwell time period $\Delta T1$ is started to be measured. When the dwell time period $\Delta T1$ reaches the vibration judgment time period $\Delta T1\_Lim$ at time t2, the above-described vibration region avoidance control is started, and the transmission gear ratio is corrected to the large side. At this time, the vibration avoidance rotation speed control section B21 of FIG. 9 limits the variation rate and the variation speed of the target rotation speed for the vibration region avoidance, for example, to about 200 rpm/s, so as to suppress the sudden variation of the engine torque, the engine speed, and so on. Consequently, as shown in FIG. 10, the variation of the transmission gear ratio toward the large side (the low side) becomes gentle. Therefore, the variations of the engine speed and the engine torque are relieved. Accordingly, it is possible to suppress the variation of the vehicle speed and the variation of the torque according to the switching of the operating point, and to suppress the decrease of the ride quality.

Besides, at the vibration region avoidance control, the engine speed is increased, and the engine torque is slightly decreased in accordance with the correction of the transmission gear ratio toward the large side. However, the variations of the vehicle speed and the driving torque of the vehicle are very small. Accordingly, this does not provide the uncomfortable feeling to the passenger. That is, in this embodiment, at the vibration region avoidance control, the correction of the engine side is not performed, and the only correction of the transmission gear ratio by the correction of the target input rotation speed of the continuously variable transmission 3 is performed. In this way, the simple control logic is performed. With this, it is possible to suppress and relieve the generation of the unnatural feeling and the uncomfortable feeling due to the vibration, and thereby to largely decrease the calculation operation and the memory usage necessary for the adaptation.

Again, with reference to FIG. 5, at step S19, it is judged whether or not the engine torque Te is equal to or smaller than a predetermined torque threshold value Te_Lim2 for the cancel of the vibration region avoidance control. When the engine torque Te is not equal to or smaller than the torque threshold value Te_Lim2, a cancel time period $\Delta T2$ described later is reset to "0" at step S24. The process returns to step S19.

When the engine torque Te is equal to or smaller than the torque threshold value Te_Lim2, the process proceeds to step S20. The cancel time period $\Delta T2$ from a timing at which the engine torque Te becomes equal to or smaller than the torque threshold value Te_Lim2 is measured and accumulated. In particular, a unit time (calculation interval) is added to a timer value which counts the cancel time period $\Delta T2$. With this, the accumulation value of the cancel time period $\Delta T2$ is renewed.

At a next step S21, it is judged whether or not the cancel time period $\Delta T2$ is equal to or greater than a predetermined cancel judgment time period $\Delta T2\_Lim$. When the cancel time period $\Delta T2$ is not equal to or greater than the cancel judgment time period $\Delta T2\_Lim$, the process returns to the step S19. When the cancel time period $\Delta T2$ becomes equal to or greater than the cancel judgment time period $\Delta T2\_Lim$, the process proceeds to step S22 to return to the normal control for attaining best fuel economy. That is, the correction of the transmission gear ratio toward the large side is released by canceling the correction of the target rotation speed for the vibration region avoidance.

Figure 11:
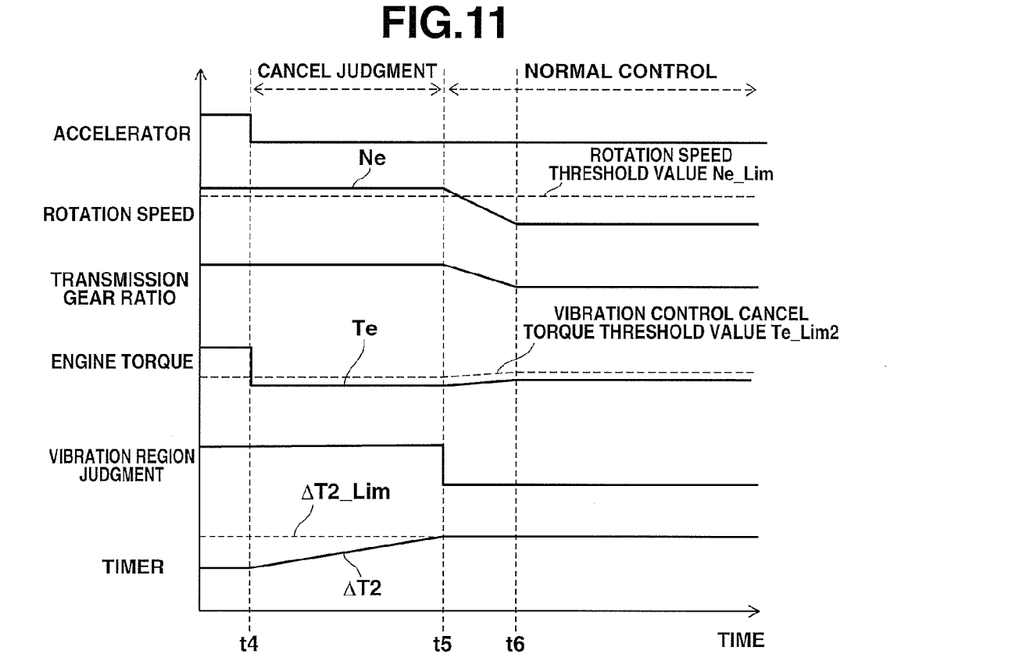
FIG. 11 is a timing chart showing a cancel of the vibration region avoidance control when the control according to the embodiment is applied.

FIG. 11 is a timing chart at the cancel of the vibration region avoidance control when this embodiment is applied. At time t4, when the engine torque Te becomes equal to or lower than the cancel torque threshold value Te_Lim, the measurement of the cancel time period $\Delta T2$ is started.

When the cancel time period $\Delta T2$ reaches the cancel judgment time period $\Delta T2\_Lim$ at time t5, the vibration region avoidance control is canceled to return to the normal control toward the operating point at which the fuel economy becomes best. In particular, the correction of the target input rotation speed toward the increase side is canceled. In this case, similarly to the above-described vibration region avoidance control, the variation rate (the variation speed) of the target input rotation speed toward the low side is limited equal to or smaller than a predetermined value (for example, about 200 rpm/s). With this, the variation (decrease) of the target rotation speed becomes gentle. With this, as shown in FIG. 11, it is possible to suppress the sudden variations of the transmission gear ratio, the engine speed, and the engine torque, and thereby to suppress the deterioration of the drivability due to the above-described sudden variation.

In the above-described embodiment, when the dwell time period $\Delta T1$ during which the operating point is stayed in the vibration risk regions $\alpha 1$ and $\alpha 2$ reaches the vibration judgment time period $\Delta T1\_Lim$, the transmission gear ratio of the continuously variable transmission 3 is varied so that the operating point is out of the vibration risk regions $\alpha 1$, $\alpha 2$. Accordingly, it is possible to prevent the unnatural feeling and the uncomfortable feeling which are caused by the continuation of the vibration during the vibration judgment time period $\Delta T1\_Lim$ or more, and thereby to improve the riding quality. Moreover, even when the operating point is in the vibration risk regions $\alpha 1$, and $\alpha 2$, the switching of the operating point for the avoiding the vibration is not performed until the dwell time period $\Delta T1$ reaches the vibration judgment time period $\Delta T1\_Lim$. With this, it is possible to prevent the switching of the operating point before the vibration is generated, or to prevent the switching at an initial stage of the vibration which the passenger does not feel. Moreover, the normal control for giving weight to a fuel economy is continued. With this, it is possible to improve the fuel economy, and to suppress the frequency of the switching. Accordingly, it is possible to suppress the decrease of the drivability and the decrease of the fuel economy according to the switching.

Moreover, the control for the vibration region avoidance is performed to correct the only transmission gear ratio of the continuously variable transmission 3 to the large side (the low side). With this, the control logic is simplified. Furthermore, it is possible to largely decrease the calculation load and the memory usage. In accordance with the correction of the transmission gear ratio toward the large side, the slight variation of the driving state such as the increase of the engine speed is generated. However, this variation is slight. This does not provide the adverse influence on the riding feeling.

In particular, this embodiment focuses on that the vehicle vibration locally becomes large due to the influence of the torsion resonance of the power train system when the transmission gear ratio is within a predetermined range (cf. the region $\alpha 2"$ in FIG. 3). Accordingly, the vehicle speed relating to the transmission gear ratio is used as the factor used in the judgment of the vibration risk region, in addition to the engine speed and the engine torque. In particular, there are provided, as the vibration risk region, the second vibration risk region $\alpha 2$ determined by the vehicle speed and the engine speed, that is, the engine speed and the transmission gear ratio, in addition to the first vibration risk region $\alpha 1$ on the low speed and the high load side of the engine which mainly causes the muffled noise, the floor vibration, and so on of the engine. Then, when the operating point is in both two vibration risk regions $\alpha 1$ and $\alpha 2$ which are determined in this way by the different factors, the riding quality may be deteriorated by superimposing the different two vibrations. Accordingly, this case is determined (judged) that it is in the vibration risk region. In this way, the vibration risk region is judged in consideration of the influence of the vibration by the transmission gear ratio (the vehicle speed). With this, it is possible to improve the accuracy of the judgment, and to suppress the deterioration of the fuel economy by the unnecessary switching to the vibration region avoidance control.

As described above, the present invention is illustrated based on the concrete embodiment. However, the present invention is not limited to the above-described embodiment. The present invention may include various variations and modifications. For example, in the above-described embodiment, two regions $\alpha 1$ and $\alpha 2$ which have different factors indicative of the vehicle driving state are used as the vibration risk region. However, three regions or more may be used. Alternatively, for more simplification, the only one vibration risk region is used, and the region judgment may be performed.

Figure 12:
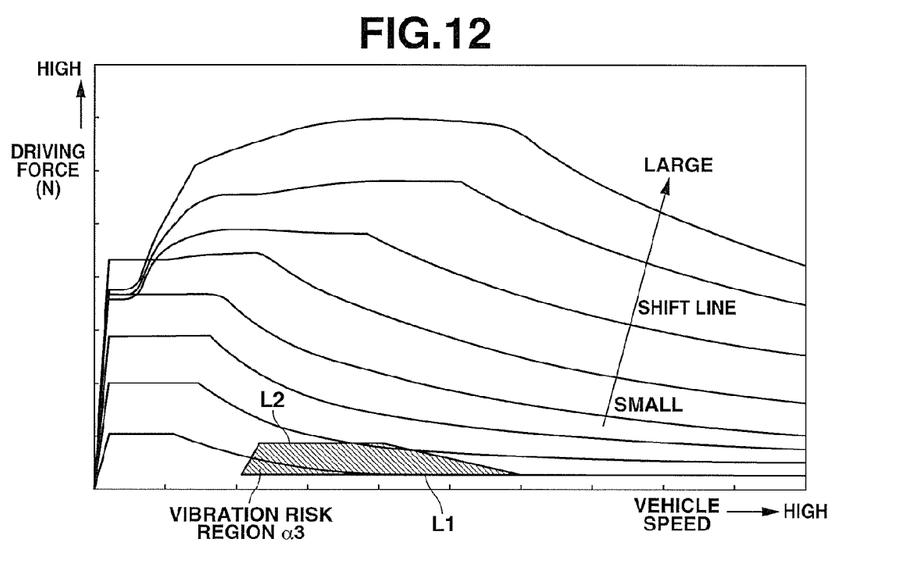
FIG. 12 is an explanation view showing an example of a vibration risk region determined by a driving force and a vehicle speed.
Figure 13:
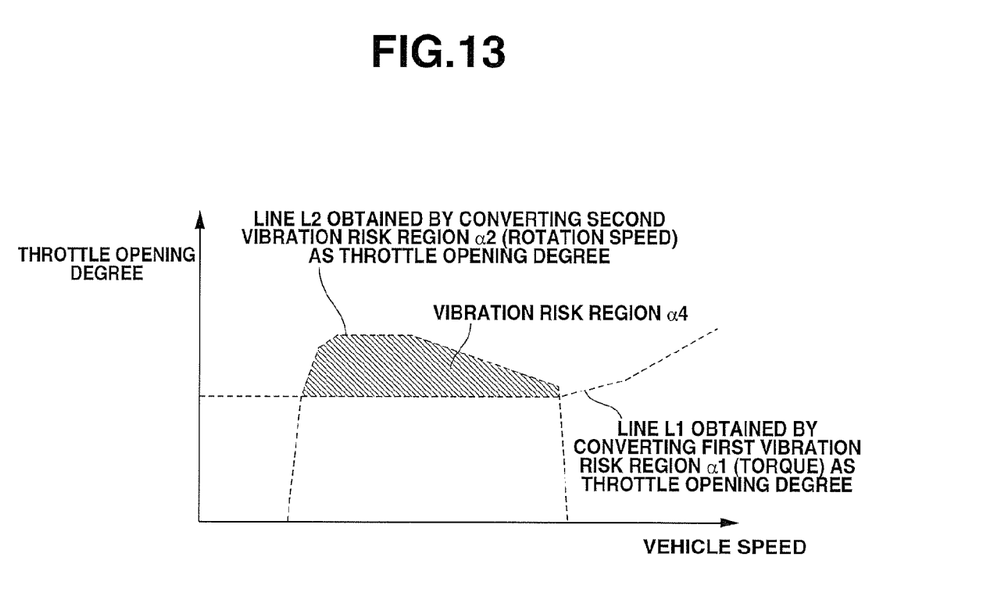
FIG. 13 is an explanation view showing one example showing the vibration risk region determined by the throttle opening degree and the vehicle speed.

For example, an example shown in FIG. 12 uses, as the vibration risk region, a vibration risk region $\alpha 3$ which is determined by the vehicle speed and the driving force of the engine. Moreover, an example shown in FIG. 13 uses, as the vibration risk region, a vibration risk region $\alpha 4$ which is determined by the vehicle speed and the throttle opening degree. Both of the regions $\alpha 3$ and $\alpha 4$ are formed by a first border line L1 obtained by converting the first vibration risk region $\alpha 1$ of the above-described embodiment as the driving force or the throttle opening degree, and a second border line L2 obtained by converting the second vibration risk region $\alpha 2$ of the embodiment as the driving force or the throttle opening degree. Accordingly, substantially similar to the embodiment, it represents a region in which the vibrations of the two different driving regions are overlapped with each other. Consequently, it is possible to obtain functions and operations which are substantially identical to those of the embodiment.

The invention claimed is:

1. A control device for a vehicle including an engine, and a continuously variable transmission arranged to continuously shift an output of the engine, and to transmit it to a driving wheel's side, the control device comprising:
   a region judging section configured to judge whether or not a operating point of the vehicle which is determined from a plurality of factors representing a driving state of the vehicle is in a predetermined vibration risk region in which vibration of the vehicle may be generated;
   a dwell time period judging section configured to measure a dwell time period during which the operating point is stayed in the vibration risk region when it is judged that the operating point is in the vibration risk region; and
   a vibration region avoidance section configured to vary a transmission gear ratio of the continuously variable transmission so that the operating point is out of the vibration risk region when the dwell time period reaches a predetermined time period.

2. The control device for the vehicle as claimed in claim 1, wherein the vibration region avoidance section is configured to vary the transmission gear ratio of the continuously variable transmission to a larger side so that the operating point is out of the vibration risk region, when the dwell time period reaches the predetermined time period.

3. The control device for the vehicle as claimed in claim 1, wherein the plurality of the factors include at least a vehicle speed.

4. The control device for the vehicle as claimed in claim 1, wherein the control device further includes a smoothing section configured to smooth, by a filtering operation, an engine speed and an engine torque which are used for the judgment of the vibration risk region by the region judging section.

5. The control device for the vehicle as claimed in claim 1, wherein the region judging section is configured to judge that the operating point is in the vibration risk region when the engine torque is equal to or greater than a predetermined region judgment torque threshold value; and the control device further comprises a cancel section configured to return the operating point to an original operating point when the engine torque is equal to or smaller than a predetermined cancel torque threshold value in a state where the operating point is moved out of the vibration risk region by the vibration avoidance section.

6. The control device for the vehicle as claimed in claim 5, wherein the cancel section is configured to return the operating point to the original operating point when a state where the engine torque is equal to or smaller than the cancel torque threshold value continues during a predetermined time period, in a state where the operating point is moved out of the vibration risk region by the vibration region avoidance section.

7. The control device for the vehicle as claimed in claim 1, wherein the vibration risk region includes a first vibration risk region determined by the engine speed and the engine torque, and a second vibration risk region determined by the vehicle speed and the engine speed; and the region judging section is configured to judge that the operating point is in the vibration risk region only when the operating point is in both the first vibration risk region and the second vibration risk region.

8. The control device for the vehicle as claimed in claim 1, wherein the vibration risk region is a region determined by the vehicle speed and the driving force.

9. The control device for the vehicle as claimed in claim 1, wherein the vibration risk region is a region determined by the vehicle speed and the throttle opening degree.

* * * * *